(12) United States Patent
Westberg et al.

(10) Patent No.: US 9,198,089 B2
(45) Date of Patent: Nov. 24, 2015

(54) CACHING ARCHITECTURE FOR STREAMING DATA BETWEEN BASE STATIONS IN MOBILE NETWORKS

(75) Inventors: Lars Westberg, Enkoping (SE); Ayodele Damola, Solna (SE); Stefan Hellkvist, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 523 days.

(21) Appl. No.: 13/522,554

(22) PCT Filed: Feb. 1, 2010

(86) PCT No.: PCT/EP2010/051200
§ 371 (c)(1),
(2), (4) Date: Jul. 17, 2012

(87) PCT Pub. No.: WO2011/091861
PCT Pub. Date: Aug. 4, 2011

(65) Prior Publication Data
US 2012/0300747 A1    Nov. 29, 2012

(51) Int. Cl.
*H04W 36/20* (2009.01)
*H04W 36/00* (2009.01)
*H04L 29/06* (2006.01)
*H04W 36/02* (2009.01)

(52) U.S. Cl.
CPC ......... *H04W 36/0011* (2013.01); *H04L 65/104* (2013.01); *H04L 65/1016* (2013.01); *H04L 65/1069* (2013.01); *H04L 65/4076* (2013.01); *H04W 36/02* (2013.01)

(58) Field of Classification Search
CPC ...................................... H04W 36/02
USPC .......................................... 370/331
See application file for complete search history.

(56) References Cited

U.S. PATENT DOCUMENTS

| 8,200,747 | B2* | 6/2012 | Apostolopoulos et al. ... 709/203 |
| 8,625,527 | B2* | 1/2014 | Zhu et al. ........... 370/331 |
| 2004/0010593 | A1 | 1/2004 | Apostolopoulos et al. |
| 2006/0120326 | A1 | 6/2006 | Takeuchi et al. |
| 2008/0310365 | A1* | 12/2008 | Ergen et al. ........... 370/331 |

* cited by examiner

*Primary Examiner* — Maharishi Khirodhar
(74) *Attorney, Agent, or Firm* — Patent Portfolio Builders, PLLC

(57) ABSTRACT

A method and apparatus for handing over a terminal connection. A handover request is sent from a source base station to a target base station. A first control message (including a session identifier for identifying the session, and current parameters for the session) is also sent from the source base station to a control server. If the target base station is associated with a cache storage unit containing the content data, a second control message (including a session identifier for identifying the session, and current parameters) is sent from the control server to the target base station. At the target base station, the content data packets are retrieved from the cache storage unit, and a header of each retrieved content data packet is populated with parameters calculated using the received current parameters and session identifier. The content data packets are then sent from the base station towards the terminal.

19 Claims, 6 Drawing Sheets

CACHING ARCHITECTURE FOR STREAMING DATA BETWEEN BASE STATIONS IN MOBILE NETWORKS

CROSS REFERENCE TO RELATED APPLICATION(S)

This application is a 35 U.S.C. §371 National Phase Entry Application from PCT/EP2010/051200, filed Feb. 1, 2010, designating the United States, the disclosure of which is incorporated by reference herein in its entirety.

TECHNICAL FIELD

The present invention relates to a system for caching data in mobile packet data networks. In particular, the invention relates to a caching architecture suitable for streaming data to users roaming between different base stations. The invention is applicable, but not limited to, a mechanism for caching content in a Video on Demand (VoD) system.

BACKGROUND

Typical file caching methods include a cache receiving a file from a file server, and storing the entire file. Later when a client desires the file, instead of serving the file from the file server, the file is served from the cache. Because the cache is typically a server that is closer to the client, or has higher bandwidth than the file server, the file is served to the client quickly from the cache.

The application of typical file caching methods to files that include streaming media data, for example Video on Demand (VoD) files, can lead to new problems. VoD systems generally either stream content through a set-top box, allowing viewing in real time, or download it to a device such as a computer, digital video recorder, personal video recorder or portable media player for viewing at any time. The data delivered by networks delivering such content can run to very large amounts, and caching can be particularly useful.

This can be understood with reference to FIG. 1, which is a schematic illustration of an exemplary architecture of a VoD system with deployed caches used to reduce the load on a central long-tail server. In the example, it can be supposed that the network uses Real-Time Streaming Protocol (RTSP) streaming, where the payload is transported over the User Datagram Protocol (UDP) in Real-Time Protocol (RTP) packets, but it will be appreciated that many other applications and protocols have a similar architecture and will have similar issues.

The architecture of FIG. 1 includes a network 100 having an origin server 101 and a number of caches 102-106. Clients 107-109 are configured to receive files and/or streaming data from the origin server 101 or the caches 102-106. The clients use RTSP to set up and control streams of RTP packets. This includes the negotiation of codecs, bitrates, ports etc for the resulting RTP stream. With RTSP the clients can start and stop the streaming, or fast forward or rewind the streamed media clip.

RTP packets are sent in sequence with a sequence number to tell the client the order of the packets. This infers a state into the protocol that the streaming server 101 needs to maintain and increment for each data packet it sends out. The sequence number is also used by the clients 107-109 to detect packet loss which is reported back to the streaming server using the Real-Time Transport Control Protocol (RTCP).

In order to reduce the load on the origin server 101 and to save bandwidth in the delivery network 100, some of the content is stored in caches 102-106 closer to the end users 107-109. It is desirable to push these caches as close to the end user as possible. However, this can give rise to problems in certain situations. For example, consider the situation in which there is mobility in the network so that the client can move around during a session (such as a mobile terminal moving between base stations). Suppose one of the clients 107 is receiving data from one of the caches 104. If the client 107 moves location so that it is now receiving data from another cache 105, dynamic parameters such as the session state (in this example, the RTP packet sequence number) need to be migrated into the new cache 105, which may or may not also include the relevant content, so that the session can continue in the new place without interruption.

Although caching solutions have been shown as an effective way of reducing the load on the transport network and have been proposed for video streaming, these solutions mainly focus on public Internet architectures and do not address the issues of mobility which is a vital part of 3GPP networks.

Long Term Evolution (LTE) is a communication network technology currently under development by the 3rd Generation Partnership Project (3GPP). LTE requires a new radio access technique termed Evolved Universal Terrestrial Radio Access Network (E-UTRAN), which is designed to improve network capacity, reduce latency in the network, and consequently improve the end-user's experience. System Architecture Evolution (SAE) is the core network architecture for LTE communication networks.

Referring to FIG. 2, the LTE/SAE architecture includes a Mobility Management Entity (MME) 24, which is responsible for control signalling. An SAE Gateway is responsible for the user data. The SAE Gateway consists of two different parts, namely a Serving Gateway (S-GW) 25 that routes user data packets, and a PDN Gateway (PDN-GW) 26 that provides connectivity between a user device and an external data network, such as a network 27 in which an operator is located to provide services such as IPTV 28 and IMS 29. These nodes are described in detail in 3GPP Technical Specification (TS) 23.401. All these nodes are interconnected by an IP network. Further nodes are the eNodeBs 22, 23, which act as base stations in the network. A Policy and Charging Rules Function, PCRF 30, detects the service flow and enforces charging policy. There are three major protocols and interfaces between these node types. These are S1-MME (between the eNodeBs 23, 23 and the MME 24), S1-U (between the eNodeBs 22, 23 and the S-GW 25), and X2 (between eNodeBs 22, 23). The corresponding protocols used in these interfaces are S1AP (S1 Application Protocol) and X2AP (X2 Application Protocol). All these protocols and interfaces are IP-based. In addition, the network may contain other nodes that are part of the above interface, for example a Home eNodeB Gateway (not shown in FIG. 2) between a Home eNodeB and rest of the nodes in the network. Currently, mobility is provided below the PDN-GW 26.

It is also helpful to consider the handover procedure in SAE/LTE networks when a mobile terminal 21 moves from a source eNodeB (eNB) 22 to a target eNB 23. According to 3GPP TS 36.300, the handover procedure is performed without involvement of the Evolved Packet Core (EPC), i.e. preparation messages are directly exchanged between the eNBs 22, 23. The release of the resources at the source side during the handover completion phase is triggered by the source eNB 22. The handover procedure is well defined in 3GPP TS 36.300 and is not reproduced here.

In the case of a System Architecture Evolution/Long Term Evolution (SAE/LTE)—network architecture, mobility of a user causes a change in attachment points into the network and introduces the following issues:

- Session transfer due to mobility. If a cache is used below the mobility anchor points (i.e. the user moves from cache to cache), the complexity of having application states within the cache generates complexity during handoffs.
- Interactions with Policy control. One of the main problems is that application nodes such as streaming servers need to interact with the Policy Charging Rule Function (PCRF) to control the usage of QoS. However, the PCRF is located above the anchor-point in the EPC-architecture and this causes a problem for a cache below the anchor-point.
- Scalability. A problem is that a centralized generation of payload requires high-capacity nodes and is difficult to scale when more traffic needs to be generated.

SUMMARY

It is the object of the present invention to obviate at least some of the above disadvantages.

It would be desirable to maintain the streaming session state for UDP based streaming protocols during handover when an origin server delegates the serving of the stream to terminals to a cache located at the edge of the network.

In accordance with one aspect of the present invention there is provided a target network element configured to act as a caching server for sending data in a session to a mobile terminal in a packet data network. The target network element comprises a communications system, which is configured to receive a handover request from a source network element in the network, the handover request instructing the target network element to continue the session previously handled by the source network element. The communications system is further configured to receive a control message from a control server, the control message comprising a content identifier for identifying content data packets stored in a cache storage unit associated with the network element, a session identifier for identifying the session, and initial session state parameters for identifying a current session state in the source network element. The communications system is further configured to retrieve the content data packets from the cache storage unit. A local storage medium is operatively connected to the communications system and configured to store session-independent parameters and the received initial session state parameters. A packet header generator is operatively connected to the communications system and local storage medium and configured to populate a header of each retrieved content data packet with header parameters calculated using the session-independent parameters together with the received initial session state parameters and session identifier. The communications system is also configured to send the content data packets towards the terminal.

Thus control messages with information of the current session state of the media stream may be sent to the caching server. Control messages may be sent out during a handover procedure so that, once handover is completed, the new caching server is aware from where to continue streaming.

The packet header generator may be configured to calculate different types of parameters: session-independent parameters, static session-specific parameters, and dynamic parameters.

The packet header generator may be configured to calculate static session-specific parameters from the initial session state parameters received from the control server, save the static session-specific parameters in the local storage medium, and insert the static session-specific parameters into each of the retrieved packets sent towards the terminal in that session.

The packet header generator may be configured to calculate dynamic parameters for each retrieved packet using the initial session state parameters received from the control server as a starting point, and insert the dynamic parameters into the retrieved packets.

In accordance with another aspect of the present invention there is provided a source network element configured to act as a caching server for sending data in a session to a mobile terminal in a packet data network. The source network element comprises a local storage medium for storing session-independent parameters and current session state parameters. A communications system is operatively connected to the local storage medium and configured to retrieve content data packets from a cache storage unit associated with the source network element. The communications system is further configured to identify that the terminal has moved within range of a target network element in the network and send a handover request to the target network element, the handover request instructing the target network element to continue the session. The communications system is further configured to send a session state message to a control server, the session state message comprising the current session state parameters and a session identifier for identifying the session. A packet header generator is operatively connected to the communications system and local storage medium and configured to populate a header of each retrieved content data packet with header parameters calculated using the session-independent parameters and current state parameters. The communications system is further configured to send the content data packets towards the terminal until handover to the target network element is complete.

It will be appreciated that any network element may operate as either or both of a source network element and a target network element. The network element may be a base station, or associated with a base station (for example by a configured tunnel).

The network element may be configured so that, if it receives packets from a control server containing content data packets which are not stored in the cache storage unit, these content data packets are stored in the cache storage unit so that the network element can act as a caching server for that content in the future.

The cache storage unit may be included as part of the network element. The data sent to the terminal may be streaming data. The packets may be RTSP packets. The packet data network may be a 3GPP network and the network element may be an eNodeB.

In accordance with another aspect of the present invention there is provided a control server for managing the provision of data in a session to a mobile terminal attached to a network element in a packet data network. The control server comprises a communications system, configured to receive a request from the terminal to begin sending content data. A storage medium contains records of content data cached at cache storage units in the network. A controller is operatively connected to the communications system and the storage medium, and is configured to retrieve the records from the storage medium, identify the content data requested by the terminal, and determine whether the network element is associated with a cache storage unit containing the content data requested by the terminal. If so, the controller is configured to instruct the communications system to send a control message towards the network element, the control message comprising a content identifier for identifying the content data in the cache storage unit, a session identifier, and initial parameters for the data stream.

A control cache storage unit comprising the content data may be associated with the control server. The controller may be configured, if the cache storage unit associated with the other network element does not contain the content data, to instruct the communications system to retrieve the content data from the control cache storage unit, populate a header of each packet of the retrieved content data with parameters calculated using the received current parameters and session identifier, and instruct the communications system to send the content data packets towards the terminal via the other network element. The control cache storage unit may be part of the control server.

In accordance with another aspect of the present invention there is provided a method of initiating a data transfer session between a network element and a terminal in a packet data network, where the network element is configured to act as a caching server and is associated with a cache storage unit. The network element receives a control message from a control server, the control message comprising a content identifier for identifying content data packets stored in the cache storage unit, a session identifier for identifying the session, and initial parameters for the session. The content data packets are retrieved from the cache storage unit. A header of each retrieved content data packet is populated with parameters calculated using the received initial parameters and session identifier. The content data packets are sent from the network element towards the terminal.

In accordance with another aspect of the present invention there is provided a method of handing over a terminal connection from a source network element to a target network element in a packet data network when the source network element is acting as a caching server and sending content data towards the terminal. A handover request is sent from the source network element to the target network element. A first control message is sent from the source network element to a control server, the first control message including a session identifier for identifying the session, and current parameters for the session. At the control server, it is identified whether or not the target network element is associated with a cache storage unit containing the content data. If so, a second control message is sent from the control server to the target network element, the second control message including a content identifier, the session identifier and the current parameters. At the target network element, the content data packets are retrieved from the cache storage unit. A header of each retrieved content data packet is populated with parameters calculated using the received current parameters and session identifier, and the content data packets are sent from the network element towards the terminal.

In accordance with another aspect of the present invention there is provided a computer program product comprising code adapted to be executed on a network element in a packet data network. The code is operable to: read a control message received at the network element from a control server, the control message comprising a content identifier for identifying content data packets stored in a cache storage unit associated with the network element, a session identifier for identifying a session, and initial parameters for the session; retrieve the content data packets from the cache storage unit; populate a header of each retrieved content data packet with parameters calculated using the received initial parameters and session identifier; and send the content data packets towards a terminal.

In accordance with another aspect of the present invention there is provided a computer program product comprising code adapted to be executed on a source network element (e.g. base station) in a packet data network. The code is operable to retrieve content data from a cache storage unit and send the content data towards a terminal; identify that the terminal is moving out of range of the source network element; send a handover request to a target network element; send a control message to a control server, the control message including a session identifier for identifying the session, and current parameters for the session.

In accordance with another aspect of the present invention there is provided a computer program product comprising code adapted to be executed on a control server in a packet data network. The code is operable to read a path switch request to a target network element (e.g. base station) received from a source network element; read a first control message received from the source network element, the first control message including a session identifier for identifying a session for transferring content data to a terminal, and current parameters for the session; identify whether or not the target network element is associated with a cache storage unit containing the content data; if the target network element is associated with a cache storage unit containing the content data, send a second control message from the control server to the target network element, the second control message including a content identifier, the session identifier and the current parameters.

The invention also includes a carrier medium carrying any of the programs described above.

BRIEF DESCRIPTION OF THE DRAWINGS

Some preferred embodiments will now be described by way of example only and with reference to the accompanying drawings, in which.

DETAILED DESCRIPTION

In order to understand the principles involved in maintaining session parameters, an exemplary embodiment is described with reference to an LTE network. It will be appreciated that this embodiment is provided by way of example only, and that the same approach may be used for other network architectures and communication protocols. Furthermore, the use of RTSP is described, but any other UDP based streaming protocol (e.g. MPEG transport stream (MPEG TS)) can also be used, or any other protocol which controls the transmission of data in a session (e.g. large files).

As discussed above, the mobility in the network is provided below the point of Present (PoP), which is currently located in the PDN-GW 26. Caching can in principle be located anywhere, but the traffic is tunnelled between the nodes (due to mobility). If caching is added into the reference architecture, it is preferable that the break-out of traffic from the tunnels is made at the Serving S-GW 25 or the eNodeB 22, 23, or that the caches are located above the PoP, i.e. within the Operators IP-service network.

Figure 1:
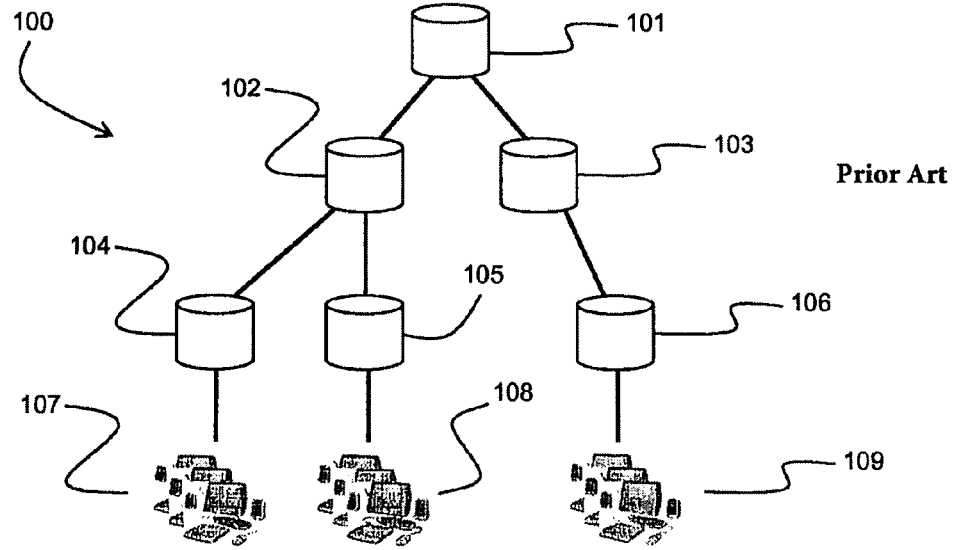
FIG. 1 is a schematic illustration of a network architecture.
Figure 2:
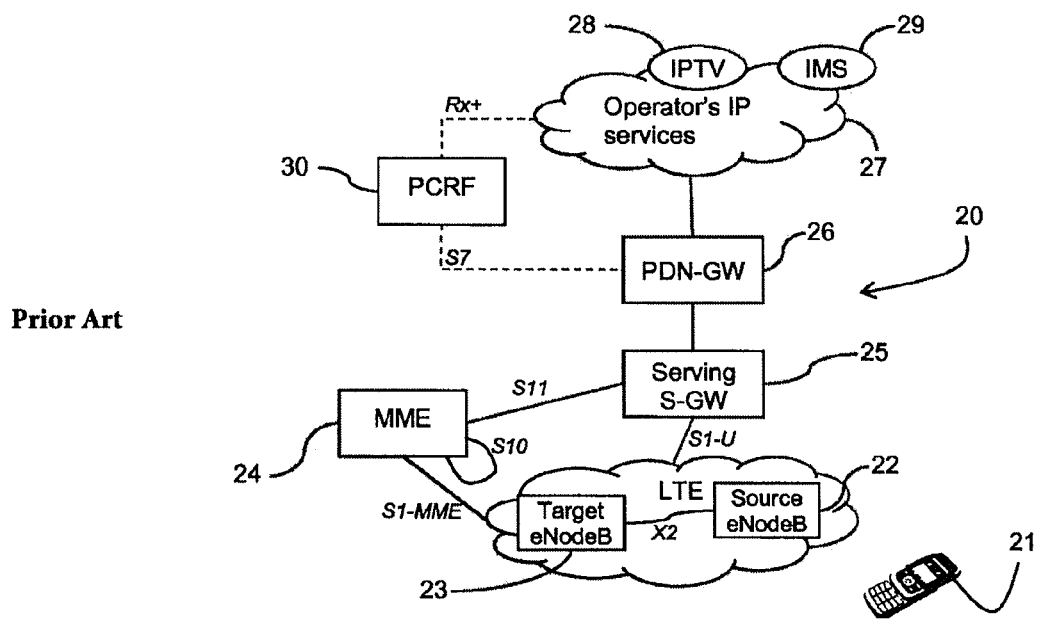
FIG. 2 is a schematic illustration of a LTE/SAE network.
Figure 3:
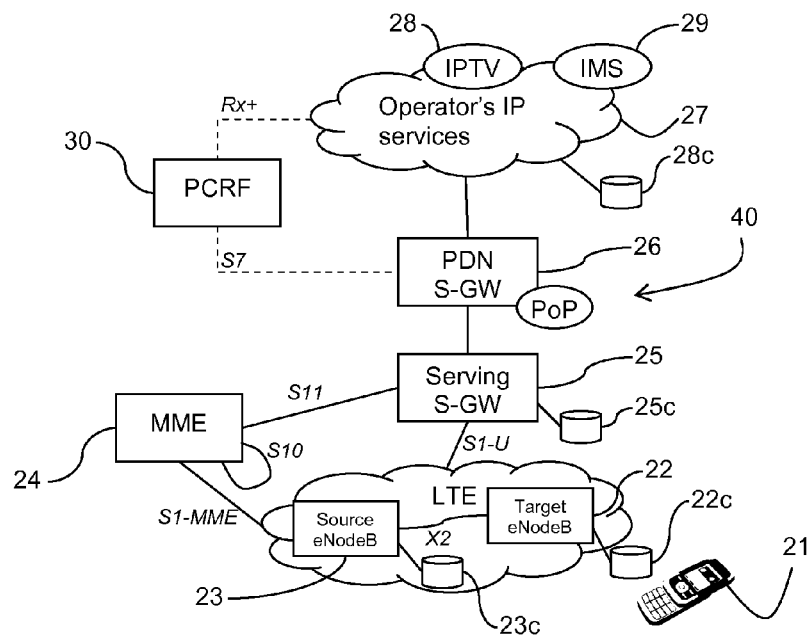
FIG. 3 is a schematic illustration of the LTE/SAE network of FIG. 2 showing possible locations for cache storage units.

This is illustrated in FIG. 3, which shows a network architecture 40 similar to that of FIG. 2. Entities which are the same in both architectures have the same reference numerals. In the architecture of FIG. 3, cache storage units 22c, 23c, 25c may be associated with the eNodeBs 22, 23, and/or S-GW 25, respectively, so that these network elements can operate as cache servers. FIG. 3 also shows a storage unit 28c associated with the network 27 in which the operator resides.

This means that an application (i.e. RTSP-state) state in the cache server must be moved at handover between cache servers (eNodeBs 22, 23/SAE GW 25).

For content which is known to be cached below the anchorpoints, the user plane RTP payload, which is the vast majority of traffic, is generated by the cache server close to the client 21 (i.e. associated with the S-GW 25 or eNodeB 22, 23). With this architecture, the application dependence becomes minimal and the application server will have improved throughput scalability because only the session control needs to be centralized.

Figure 4:
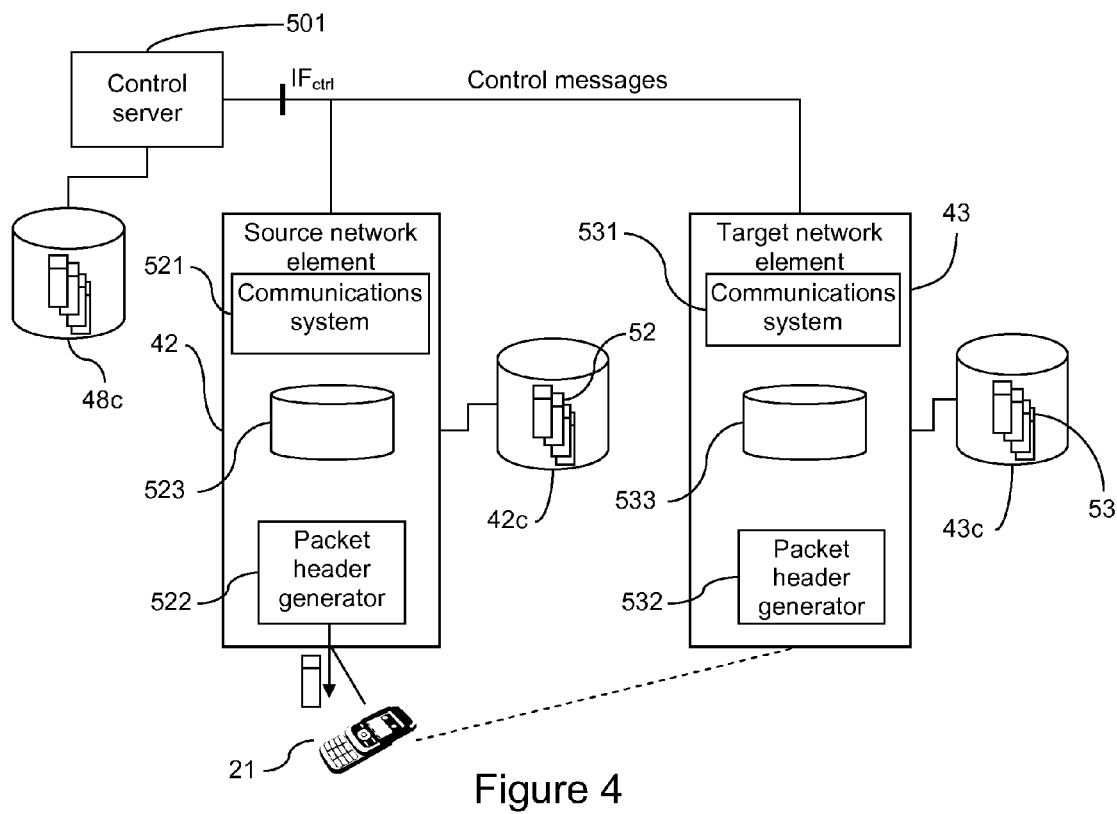
FIG. 4 is a schematic illustration of some of the network elements configured to maintain state in a handover.

In order to implement this, the eNBs 22, 23 (or S-GW 25) needs to have functionality including storage capacity and processing logic. FIG. 4 is a schematic illustration of certain parts of a more general network, highlighting the functionality included in source and target network elements 42, 43 which act as caching servers. The source and target network elements could be eNodeBs or serving S-GWs in an LTE network as shown in FIG. 3, or base stations or serving gateways in other forms of network architecture. The source and target elements 42, 43 are associated with cache storage units 42c, 43c which are pre-populated with content (e.g. RTP packets) 52, 53. Each network element 42, 43 includes a communications system 521, 531 operating a traffic breakout function (described below) and a packet header generator 522, 532 for enabling packets sent from each network element towards the user to be headed by the correct parameters. As described below, these parameters must indicate a single stream to the terminal 21 even following a handover from the source network element 42 to the target network element 43.

This is achieved by sending control messages with information of the current play-out position of the media stream from a control server 501 (located in the operator's network 27 shown in FIG. 3 and being associated with a control cache storage unit 48c) to the network elements 42, 43 attached to cache storage units 42c, 43c, which perform the streaming during a handover procedure. Control messages are sent out during the handover procedure, so once the handover is completed the target network element 43 can continue to stream data from the position that the source network element 42 had reached before handover. Each network element 42, 43 includes a local storage medium in which session state parameters are stored. As described below, these may include session-independent parameters and static session-specific parameters.

Each cache-enabled network element 42, 43 has a packet header generator 522, 532 which uses the input from the control server 501 sent in the control messages over the interface $IF_{ctrl}$.

The cache storage units 42c, 43c can be located on a separate physical site from the network elements 42, 43, for example in an aggregation network (not shown) which is part of the communication network. This architecture allows a cache to be used by several network elements.

The network elements 42, 43 bridge two tunnelling types: an air interface tunnel (not shown) in which the IP packets are encapsulated for transferring to the cache storage units 42c, 43c (e.g. using the Packet Data Convergence Protocol (PDCP)), and another tunnel (not shown) for the transmission network where the IP packets are encapsulated (e.g. using the GPRS Tunnelling Protocol (GTP)). Therefore it is simple to redirect some IP packets to the cache storage units 42c, 43c, rather than forward the packets along the GTP tunnel, in this case to the cache 42c, 43c. Not all traffic can be cached (for example conversational telephony will never be cached), so only traffic which is cache related can be re-directed by the communication system 521. This distinction between traffic that should be sent to the cache and traffic that should not is carried out by the traffic break out function operated by the communications systems 521, 531 shown in FIG. 4. In addition, the communications systems 521, 531 act to retrieve the cached data 52, 53 from the cache storage units 42c, 43c to pass to the packet header generators 522, 532.

It will be appreciated that the communications systems 521, 531 and packet header generators 522, 532 are shown as separate entities, but may in fact be operated by the same or different processors. Furthermore, they may be operated by hardware or software. If they are operated by software, either or both may include a processor and a memory including a computer program product which instructs the unit to perform the necessary operations.

It will also be appreciated that the cache storage units 42c, 43c are shown as external to the network elements 42, 43, but they may be integral with the network elements.

Figure 5:
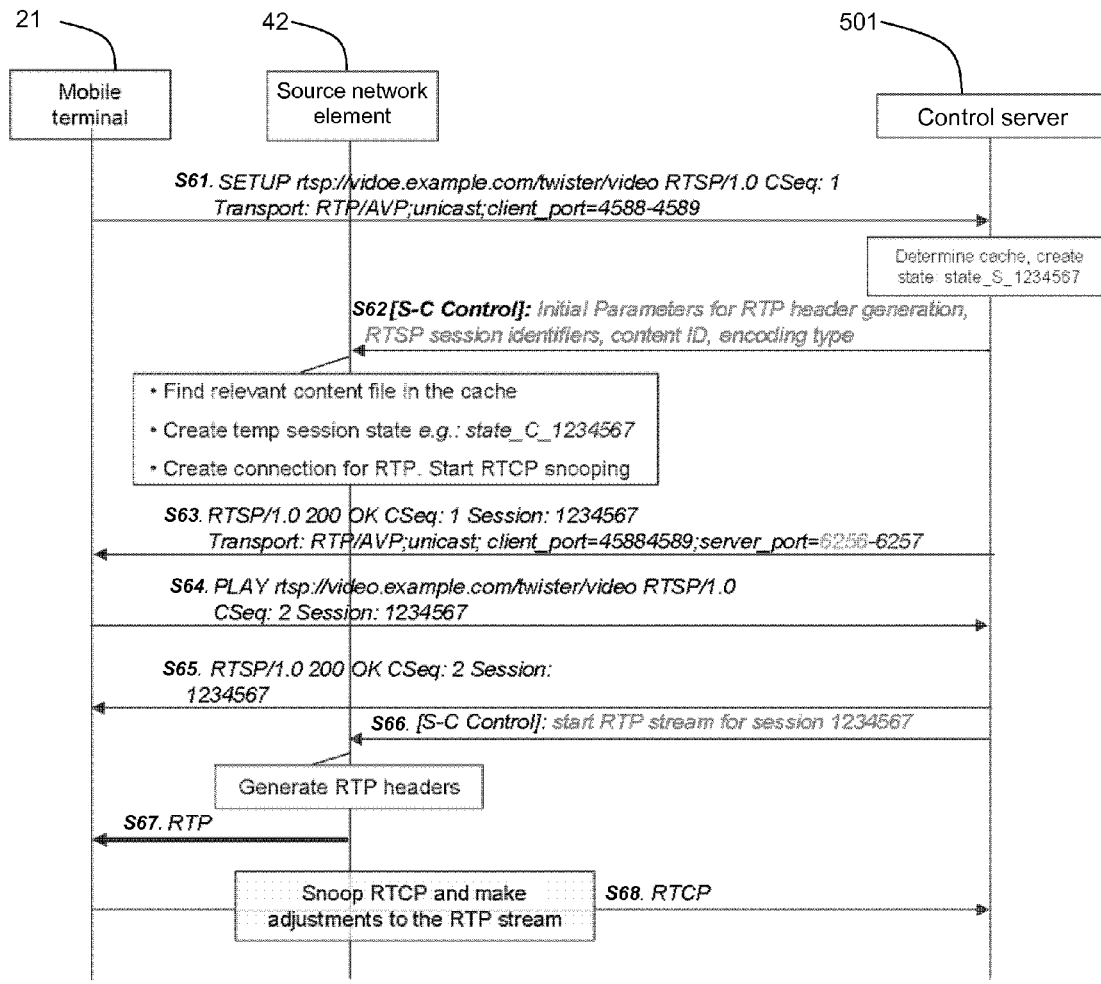
FIG. 5 is a sequence diagram illustrating the steps involved in setting up a streaming session when the content is provided by a network element (e.g. an eNodeB) acting as a cache server.
Figure 6:
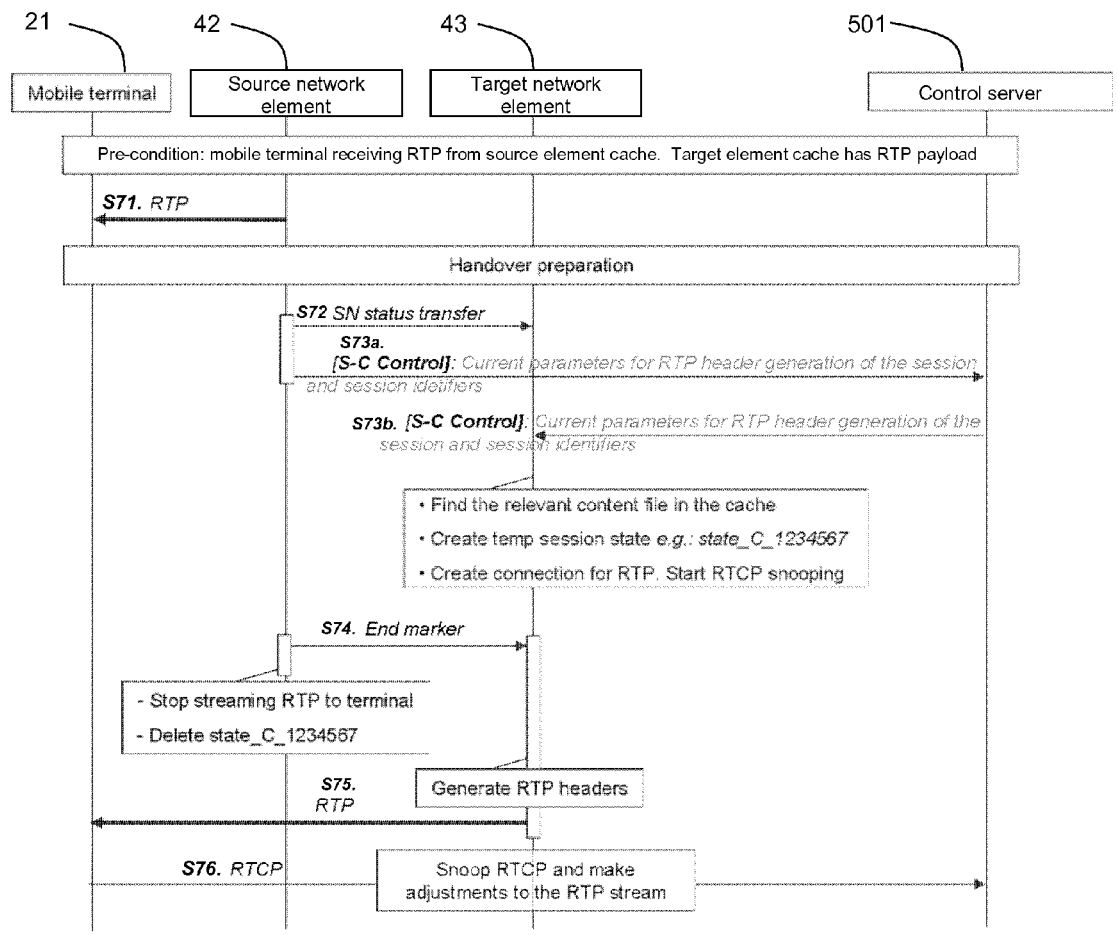
FIG. 6 is a sequence diagram illustrating the steps involved in handing over from a source network element acting as a cache server to a target network element when the target network element has access to the content and can therefore act as a cache server.
Figure 7:
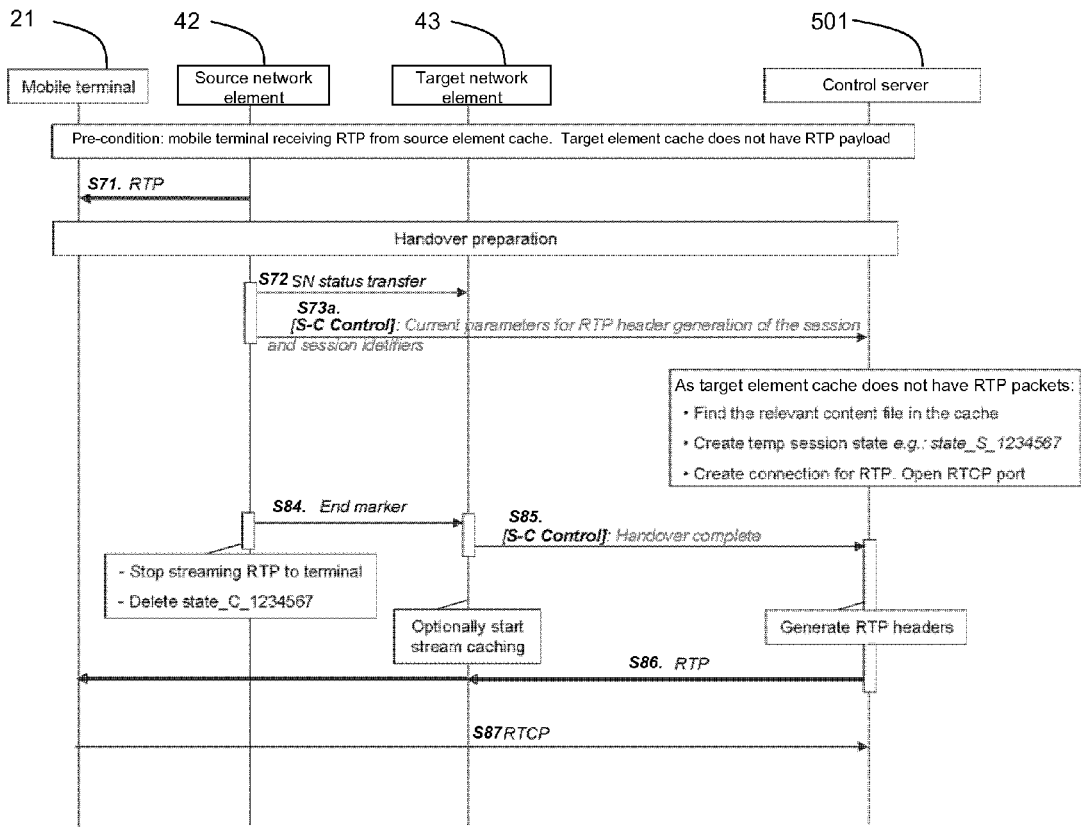
FIG. 7 is a sequence diagram illustrating the steps involved in handing over from a source network element acting as a cache server to a target network element when the target network element does not have access to the content and therefore cannot act as a cache server.

FIGS. 5, 6 and 7 are sequence diagrams illustrating how the network elements 42, 43 function as content cache servers, and how the issue of handover is addressed.

FIG. 5 is a sequence diagram illustrating the steps involved in setting up a streaming session when the content is provided by a cache server located at a network element 42 (e.g. an eNodeB). The cache functions are effectively split between the network elements 42, 43 and the control server 501.

S61. A RTSP SETUP message is sent from the terminal 21 to the Control server 501. The control server 501 determines whether the content is in a cache storage unit 42c maintained by the network element 42 and, if so, creates a state for the session.

S62. The control server 501 sends to the network element 42 the RTSP session identifiers, content ID, encoding type, and initial parameters for RTP header generation. The network element 42 uses this information to find the relevant file in the cache storage unit 42c and extract it, create a temporary session state, and create a connection for RTP.

S63. The control server 501 provides delivery details to the terminal 21.

S64. The terminal 21 requests that the streaming is played by sending a RTSP PLAY message to the control server 501.

S65. The control server 501 responds to the terminal 21 with a 200 OK response.

S66. The control server also instructs the network element 42 to start sending the data towards the terminal 21.

S67. The network element 42 generates the RTP headers and sends RTP data towards the terminal 21.

S68. The network element snoops RTCP and makes adjustments to the RTP stream.

FIG. 6 is a sequence diagram illustrating the handover from the source network element 42 (e.g. base station, eNodeB, S-GW) to the target network element (e.g. base station, eNodeB, S-GW) 43.

S71. RTP is being streamed from the source network element (cache server) 42. A handover preparation event is carried out, as specified for example in 3GPP TS 36.300.

S72. After a handover decision by the source network element 42, a source node status transfer message is sent to the target network element 43. The new logic residing in the target network element 42 uses this message as a trigger for informing the control server 501 of a handover preparation.

S73a. The control server 501 is notified of the handover preparation event, and the source network element 42 also sends current parameters for payload generation and other session state information in the same message.

S73b. The control server 501 forwards the received current parameters for payload generation to the target network element 43. The target network element 43 prepares for serving cached RTP to the terminal 21. As before (see step S62), the parameters provided by the control server 501 to the target network element 43 enable it to find and extract the relevant file from the cache 43c, create a temporary session state, and create a connection for RTP.

S74. An 'end marker' message is sent from the source network element 42 to the target network element 43. This serves as a trigger to the source network element 42 to stop streaming and to the target network element 43 to start stream generation. S75. The RTP packets are now streamed from the target network element 43. S76. The target network element 43 intercepts RTCP sent to the control server 501 and adjusts the RTP stream accordingly.

It will be appreciated that, sometimes, when a terminal 21 moves from a source network element (e.g. base station) 42 to a target network element (base station) 43, the target element 43 does not have the content locally. If this is the case, the control server 501 must continue the streaming towards the terminal 21. This is shown in FIG. 7.

The start of the handover begins in the same way as described with reference to FIG. 6.

S71. RTP is being streamed from the cache of the source network element 42. A handover preparation event is carried out, as specified for example in 3GPP TS 36.300.

S72. After a handover decision by source network element 42, a source node status transfer message is sent to the target network element 43. The logic residing in the target network element 42 uses this message as a trigger for informing the control server 501 of a handover preparation.

S73a. The control server 501 is notified of the handover preparation event, and the source network element 42 also sends current parameters for payload generation and other session state information in the same message.

Since the source network element 43 does not have the necessary content, the control server 501 itself prepares to send the necessary content to the terminal 21. The relevant content file is found in and retrieved from the cache storage unit 48c. A temporary session state is created on the basis of the parameters sent by the source network element 42, and an RTP connection is created.

S84. The end marker is sent from the source network element 42 to the target network element 43. This acts as a trigger to the source network element 42 to stop streaming.

S85. The target network element 43 sends a message to the control server 501 confirming that handover is complete.

S86. The control server 501 generates the necessary RTP headers and starts RTP streaming towards the terminal 21. Optionally, the packets of the RTP stream can be cached by the target network element 43 as they pass through, enabling the target network element 43 to save these packets in its associated cache 43c so that it can act as a cache server for this content in future.

S87. RTCP messages are sent from the terminal 21 to the control server 501.

Figure 8:
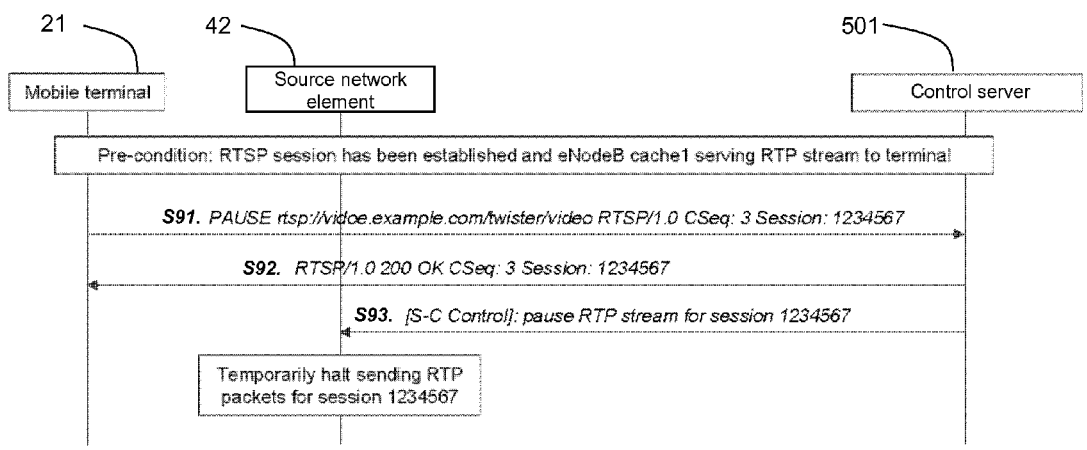
FIG. 8 is a sequence diagram illustrating the steps involved in pausing a stream provided by a caching server.

FIG. 8 illustrates the interactions required if the user decides to pause the RTP stream. It is illustrated here with reference to the source network element 42 but it will be appreciated that it would equally well apply to the target network element 43.

S91. A RTSP PAUSE command is sent from the terminal 21 to the control server 501.

S92. A 200 OK message is returned to the terminal.

S93. The control server instructs the source network element 42 to halt (temporarily) sending RTP packets to the terminal 21.

An alternative for step S93 is for the logic on the source network element 42 to snoop the 200 OK message in step S92 and halt the RTP stream based on it.

As described in the introduction, streaming packets such as RTP packets include various parameters in their headers. Such parameters can be grouped into three different types:

1. Parameters which are static for all sessions (i.e. session independent). Examples include protocol definition, version, header length, total length, flags, fragment offset, TTL.
2. Parameters which are static during a given session but which are unique to that session. Examples include Terms of Service (ToS), source address, destination address, source port, destination port, synchronisation source (SSRC) identifier, contributing source (CSRC) identifier. These parameters are the same for all packets in a given session.
3. Parameters which are dynamic within a session. Examples include packet identification, sequence number, timestamp. These parameters change between individual packets.

The session independent parameters ("1" above) can be stored together with the data in the cache storage units 42c, 43c or the local storage media 523, 533. Every time a session is started, these parameters can automatically be inserted into all packets of that session.

The session-specific parameters ("2" above) are sent from the control server 501 to the source network element 42 in step S62 shown in FIG. 5 and saved in the local storage medium 523. This provides enough information for the source network element 42 to populate packet headers with these parameters for that session.

The session-specific parameters must also be sent to the target network element 43 during a handover. The control sever 501 knows these parameters for any given session and they do not change during the session, and they are therefore sent to the target network element in step S73b shown in FIG. 6. This then provides enough information for the target network element 43 to populate packet headers with these parameters for that session. If the handover occurs as shown in FIG. 7, then the headers of the RTP packets (generated in the control server 501 and sent towards the terminal via the target network element 43 in step S86) are generated using these session-specific parameters.

The dynamic parameters ("3" above) are calculated by the source or target network element 42, 43 once the initial parameters for RTP generation have been provided by the control server 501 in step S62 or S73*b*. If a handover is made, an indication of these initial parameters must first be sent to the control server 501 in step S73*a*. If the handover is to a target network element which does not have the required content, as shown in FIG. 7, then the dynamic parameters are calculated in the control server 501 following step S73*a*.

The calculation of each dynamic parameter can be considered as a difference from an initial value ("context"). Thus, for each packet, the dynamic parameter is calculated as the initial value plus some additional value ("delta") which depends on the payload content stored in the cache 42*c*, 43*c*, 48*c*.

Thus, when the session is first configured as shown in FIG. 5, an initial value for each dynamic parameter is sent from the control server 501 to the source network element 42 in step S62. When a handover is performed, the source network element 42 sends the current value for each dynamic parameter to the control server 501 in step S73*a*. If the target network element 43 has content, this current value is sent from the control server 501 to the target network element 43 in step S73*b*, and this current value is used as a new initial value for subsequent parameter generation by the target network element 43. If the target network element does not have the content cached, the current value is used by the control server 501 itself for subsequent parameter generation.

There is also a fourth sub-group related to checksum calculation: parameters in the fourth sub-group are similar to the dynamic parameters discussed above and are calculated from other parameters in the header. These are implemented as a part of the packet modifier/generation function.

Figure 9:
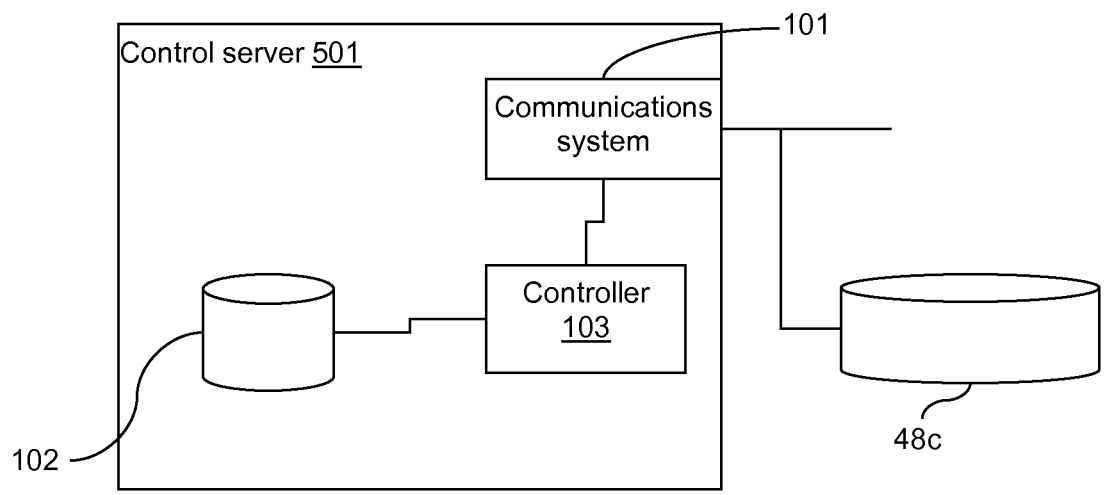
FIG. 9 is a schematic illustration of a control server.

FIG. 9 is a schematic illustration of a control server 501. The server comprises a communications system which receives a request from the terminal 21 (via the source network element 42) to provide content data. A storage medium 102 contains records of content data stored at cache storage units in the network. A controller 103 retrieves the records from the storage medium, identifies that the source network element 42 is associated with the cache storage unit 42*c* containing the content data 52, and instructs the communications system 101 to send a control message to the source network element 42. The control message comprises a content identifier for identifying the content data in the cache storage unit, a session identifier, and initial parameters for the data stream as described above.

The control server 501 is associated with a control cache storage unit 48*c* (which may be included as part of the control server 501). If the cache storage unit 42*c* associated with the source network element 42 does not have the content data 52, then the content data is instead retrieved from the control cache storage unit 48*c* The header of each packet of the retrieved content data is populated using the session identifier and initial parameters, and the communications system sends the content data packets towards the terminal via the target network element 43.

The above arrangements enable closer proximity between the stream source (source/target network element 42, 43 e.g. eNodeB/RBS cache) and the user terminal. A better QoS for the end users can thus be achieved. The probability of packet loss is reduced, as is the content access latency. The bandwidth of links above the caches can be saved. This means that network capacity investments can be replaced with storage, which is generally cheaper.

The above discussion touches on one situation in which caching may be useful, but it will be appreciated that there are many other cases where the same principles may be applied. For example, similar caching processes are applicable for VoD using RTP over UDP and HTTP over TCP. The data need not be streaming data: the process can also be used when a long TCP session is in operation. Furthermore, the processes can be used for 2G and 3G networks in addition to LTE. It will be appreciated that, in such situations, units equivalent to the LTE units described above will be used. For example, the base stations will not be eNodeBs as described above, but will be appropriated for the relevant network architecture.

The invention claimed is:

1. A target network element configured to act as a caching server for sending data in a session to a mobile terminal in a packet data network, the target network element comprising:
a communications system comprising a memory and a processor coupled to the memory, configured to:
receive a handover request from a source network element in the network, the handover request instructing the target network element to continue the session previously handled by the source network element;
receive a control message from a control server, the control message comprising a content identifier for identifying content data packets stored in a cache storage unit associated with the target network element, a session identifier for identifying the session, and initial session state parameters for identifying a current session state in the source network element; and
retrieve the content data packets from the cache storage unit;
a local storage medium operatively connected to the communications system for storing session-independent parameters and the received initial session state parameters; and
a packet header generator operatively connected to the communications system and local storage medium, and configured to populate a header of each retrieved content data packet with header parameters calculated using the session-independent parameters together with the received initial session state parameters and session identifier;
wherein the communications system is further configured to send the content data packets towards the terminal.

2. The target network element of claim 1, wherein the packet header generator is configured to calculate static session-specific parameters from the initial session state parameters received from the control server, save the static session-specific parameters in the local storage medium, and insert the static session-specific parameters into each of the retrieved packets sent towards the terminal in that session.

3. The target network element of claim 1, wherein the packet header generator is configured to calculate dynamic parameters for each retrieved packet using the initial session state parameters received from the control server as a starting point, and insert the dynamic parameters into the retrieved packets.

4. The target network element of claim 1, wherein the target network element is a base station or is associated with a base station via a configured tunnel.

5. The target network element of claim 1, further configured so that, if it receives packets from a control server containing content data packets which are not stored in the cache storage unit, these content data packets are stored in the cache storage unit.

6. The target network element of claim 1, wherein the cache storage unit is included in the target network element.

7. The target network element of claim 1, wherein the data sent to the terminal is streaming data.

8. The target network element of claim 1, wherein the packets are RTP packets.

9. The target network element of claim 1, wherein the packet data network is a 3GPP network, and the target network element is an eNodeB.

10. A source network element configured to act as a caching server for sending data in a session to a mobile terminal in a packet data network, the source network element comprising:
- a local storage medium for storing session-independent parameters and current session state parameters;
- a communications system comprising a memory and a processor coupled to the memory, the communications system being operatively connected to the local storage medium and configured to:
- retrieve content data packets from a cache storage unit associated with the source network element;
- identify that the terminal has moved within range of a target network element in the network;
- send a handover request to the target network element, the handover request instructing the target network element to continue the session; and
- send a session state message to a control server, the session state message comprising the current session state parameters and a session identifier for identifying the session; and
- a packet header generator operatively connected to the communications system and local storage medium, and configured to populate a header of each retrieved content data packet with header parameters calculated using the session-independent parameters and current state parameters;
- wherein the communications system is further configured to send the content data packets towards the terminal until handover to the target network element is complete.

11. The source network element of claim 10, wherein the packet header generator is configured to calculate static session-specific parameters, save the static session-specific parameters in the local storage medium, and insert the same static session-specific parameters into each of the retrieved packets sent towards the terminal in that session.

12. The source network element of claim 10, wherein the packet header generator is configured to calculate dynamic parameters for each retrieved packet using the current session state parameters as a starting point, and insert the dynamic parameters into the retrieved packets.

13. The source network element of claim 10, wherein the source network element is a base station or is associated with a base station via a configured tunnel.

14. The source network element of claim 10, further configured so that, if it receives packets from a control server containing content data packets which are not stored in the cache storage unit, these content data packets are stored in the cache storage unit.

15. The source network element of claim 10, wherein the cache storage unit is included in the source network element.

16. The source network element of claim 10, wherein the data sent to the terminal is streaming data.

17. The source network element of claim 10, wherein the packets are RTP packets.

18. The source network element of claim 10, wherein the packet data network is a 3GPP network, and the source network element is an eNodeB.

19. A system for transmitting data through one or more packet data networks, the system comprising a target network element configured to act as a caching server for sending data in a session to a mobile terminal in a packet data network, the target network element comprising:
- a communications system comprising a memory and a processor coupled to the memory, the communications system being configured to:
- receive a handover request from a source network element in the network, the handover request instructing the target network element to continue the session previously handled by the source network element;
- receive a control message from a control server, the control message comprising a content identifier for identifying content data packets stored in a cache storage unit associated with the target network element, a session identifier for identifying the session, and initial session state parameters for identifying a current session state in the source network element; and
- retrieve the content data packets from the cache storage unit;
- a local storage medium operatively connected to the communications system for storing session-independent parameters and the received initial session state parameters; and
- a packet header generator operatively connected to the communications system and local storage medium, and configured to populate a header of each retrieved content data packet with header parameters calculated using the session-independent parameters together with the received initial session state parameters and session identifier;
- wherein the communications system is further configured to send the content data packets towards the terminal; and the control server.

* * * * *